(12) United States Patent
Singh et al.

(10) Patent No.: US 9,244,572 B2
(45) Date of Patent: Jan. 26, 2016

(54) ELECTRONIC DEVICE INCLUDING TOUCH-SENSITIVE DISPLAY AND METHOD OF DETECTING TOUCHES

(75) Inventors: Amit Pal Singh, Waterloo (CA); John Edward Dolson, Carp (CA)

(73) Assignee: BlackBerry Limited, Waterloo (CA)

( * ) Notice: Subject to any disclaimer, the term of this patent is extended or adjusted under 35 U.S.C. 154(b) by 77 days.

(21) Appl. No.: 13/464,811

(22) Filed: May 4, 2012

(65) Prior Publication Data

US 2013/0293507 A1 Nov. 7, 2013

(51) Int. Cl.
*G06F 3/044* (2006.01)
*G06F 1/32* (2006.01)

(52) U.S. Cl.
CPC .............. *G06F 3/044* (2013.01); *G06F 1/3262* (2013.01); *G06F 1/3265* (2013.01); *G06F 2203/04105* (2013.01); *Y02B 60/1242* (2013.01)

(58) Field of Classification Search
CPC ...... G06F 1/3265; G06F 1/3262; G06F 3/044
USPC .................................................. 345/173–175
See application file for complete search history.

(56) References Cited

U.S. PATENT DOCUMENTS

| | | | |
|---|---|---|---|
| 6,222,528 B1 * | 4/2001 | Gerpheide et al. ............ | 345/173 |
| 6,879,930 B2 * | 4/2005 | Sinclair et al. ................ | 702/150 |
| 7,911,456 B2 | 3/2011 | Gillespie et al. | |
| 7,986,313 B2 | 7/2011 | Krah | |
| 8,237,453 B2 * | 8/2012 | Badaye et al. ................ | 324/658 |
| 8,294,687 B1 * | 10/2012 | Ksondzyk ..................... | 345/173 |
| 8,648,833 B2 * | 2/2014 | Lee et al. ...................... | 345/174 |
| 8,654,083 B2 * | 2/2014 | Hotelling ............ | G02F 1/13338 345/173 |
| 2007/0247443 A1 | 10/2007 | Philipp | |
| 2008/0224971 A1 * | 9/2008 | Utsunomiya et al. ........... | 345/87 |
| 2008/0246496 A1 | 10/2008 | Hristov et al. | |
| 2008/0309627 A1 * | 12/2008 | Hotelling et al. ............. | 345/173 |
| 2009/0189867 A1 | 7/2009 | Krah et al. | |
| 2009/0273573 A1 | 11/2009 | Hotelling | |
| 2010/0001973 A1 * | 1/2010 | Hotelling et al. ............. | 345/174 |
| 2010/0060610 A1 * | 3/2010 | Wu ........................ | G06F 3/044 345/174 |
| 2010/0066692 A1 * | 3/2010 | Noguchi et al. .............. | 345/173 |
| 2010/0144391 A1 * | 6/2010 | Chang .................. | G02F 1/13338 455/566 |
| 2010/0194697 A1 * | 8/2010 | Hotelling et al. ............. | 345/173 |
| 2010/0220075 A1 * | 9/2010 | Kuo et al. ..................... | 345/174 |
| 2010/0245286 A1 | 9/2010 | Parker | |
| 2010/0245289 A1 | 9/2010 | Svajda | |

(Continued)

FOREIGN PATENT DOCUMENTS

WO WO2011/137200 A1 11/2011

OTHER PUBLICATIONS

Extended European Search Report dated Sep. 21, 2012, issued in respect of corresponding European Patent Application No. 12166812.3.

(Continued)

*Primary Examiner* — Kumar Patel
*Assistant Examiner* — Sejoon Ahn
(74) *Attorney, Agent, or Firm* — Geoffrey deKleine; Borden Ladner Gervais LLP

(57) ABSTRACT

A touch-sensitive display includes first electrodes and second electrodes arranged and constructed to detect touches by mutual-capacitance touch sensing, and third electrodes and the second electrodes arranged and constructed to detect touches by self-capacitance touch sensing, wherein the first electrodes are different from the third electrodes.

3 Claims, 3 Drawing Sheets

(56) References Cited

U.S. PATENT DOCUMENTS

| | | | | |
|---|---|---|---|---|
| 2010/0252335 | A1* | 10/2010 | Orsley | 178/18.03 |
| 2010/0271330 | A1 | 10/2010 | Philipp | |
| 2011/0007021 | A1* | 1/2011 | Bernstein et al. | 345/174 |
| 2011/0007030 | A1* | 1/2011 | Mo et al. | 345/174 |
| 2011/0018557 | A1* | 1/2011 | Badaye | 324/658 |
| 2011/0018829 | A1* | 1/2011 | Peng | 345/173 |
| 2011/0025639 | A1* | 2/2011 | Trend et al. | 345/174 |
| 2011/0080367 | A1 | 4/2011 | Marchand et al. | |
| 2011/0095997 | A1* | 4/2011 | Philipp | 345/173 |
| 2011/0141040 | A1* | 6/2011 | Kang et al. | 345/173 |
| 2011/0157068 | A1* | 6/2011 | Parker et al. | 345/174 |
| 2011/0157680 | A1* | 6/2011 | Weng | G02F 1/167 359/296 |
| 2011/0169667 | A1* | 7/2011 | Rothkopf et al. | 341/20 |
| 2011/0175895 | A1 | 7/2011 | Hayakawa et al. | |
| 2011/0187677 | A1* | 8/2011 | Hotelling et al. | 345/174 |
| 2011/0193809 | A1* | 8/2011 | Walley et al. | 345/173 |
| 2011/0210941 | A1 | 9/2011 | Reynolds et al. | |
| 2011/0227866 | A1* | 9/2011 | Kawaguchi et al. | 345/174 |
| 2011/0242100 | A1 | 10/2011 | Yamazaki et al. | |
| 2011/0279406 | A1 | 11/2011 | Kawaguchi et al. | |
| 2011/0285675 | A1 | 11/2011 | Amano et al. | |
| 2011/0291986 | A1 | 12/2011 | Rebeschi et al. | |
| 2011/0298737 | A1* | 12/2011 | Maeda et al. | 345/173 |
| 2012/0013544 | A1* | 1/2012 | Philipp | 345/173 |
| 2012/0026132 | A1* | 2/2012 | Hotelling et al. | 345/174 |
| 2012/0043977 | A1* | 2/2012 | Kremin et al. | 324/686 |
| 2012/0044199 | A1* | 2/2012 | Karpin et al. | 345/174 |
| 2012/0081328 | A1* | 4/2012 | Kandziora et al. | 345/174 |
| 2012/0105133 | A1* | 5/2012 | Kim et al. | 327/517 |
| 2012/0105357 | A1* | 5/2012 | Li et al. | 345/174 |
| 2012/0113027 | A1* | 5/2012 | Song et al. | 345/173 |
| 2012/0127124 | A1* | 5/2012 | Zanone et al. | 345/174 |
| 2012/0133614 | A1* | 5/2012 | Bytheway et al. | 345/174 |
| 2012/0154324 | A1* | 6/2012 | Wright et al. | 345/174 |
| 2012/0169648 | A1* | 7/2012 | Luo | 345/174 |
| 2012/0206403 | A1* | 8/2012 | Wang et al. | 345/174 |
| 2012/0217982 | A1* | 8/2012 | Narayanasamy et al. | 324/686 |
| 2012/0218199 | A1* | 8/2012 | Kim et al. | 345/173 |
| 2012/0227259 | A1* | 9/2012 | Badaye et al. | 29/846 |
| 2012/0235949 | A1* | 9/2012 | Ligtenberg | 345/174 |
| 2012/0256873 | A1* | 10/2012 | Herman | 345/174 |
| 2012/0256877 | A1* | 10/2012 | Lin et al. | 345/174 |
| 2012/0313881 | A1* | 12/2012 | Ge et al. | 345/174 |
| 2013/0030740 | A1* | 1/2013 | Bulea | 702/65 |
| 2013/0038339 | A1* | 2/2013 | Peterson et al. | 324/679 |
| 2013/0044074 | A1* | 2/2013 | Park et al. | 345/174 |
| 2013/0050130 | A1* | 2/2013 | Brown | 345/174 |
| 2013/0076647 | A1* | 3/2013 | Yousefpor et al. | 345/173 |
| 2013/0093724 | A1* | 4/2013 | Liu | 345/174 |
| 2013/0106755 | A1* | 5/2013 | Hotelling et al. | 345/173 |
| 2013/0141343 | A1* | 6/2013 | Yu et al. | 345/173 |
| 2013/0154996 | A1* | 6/2013 | Trend et al. | 345/174 |
| 2013/0215075 | A1* | 8/2013 | Lee et al. | 345/174 |
| 2013/0222317 | A1* | 8/2013 | Abiru et al. | 345/173 |
| 2013/0293507 | A1 | 11/2013 | Singh et al. | |
| 2013/0335362 | A1* | 12/2013 | Miyazawa et al. | 345/173 |
| 2014/0071360 | A1* | 3/2014 | Chang et al. | 349/12 |
| 2014/0176480 | A1* | 6/2014 | Shepelev et al. | 345/174 |
| 2014/0267145 | A1* | 9/2014 | Shepelev | 345/174 |

OTHER PUBLICATIONS

Office Action dated Feb. 28, 2014, issue in respect of corresponding Korean Patent Application No. 10-2013-0040283 (No English translation available).

* cited by examiner

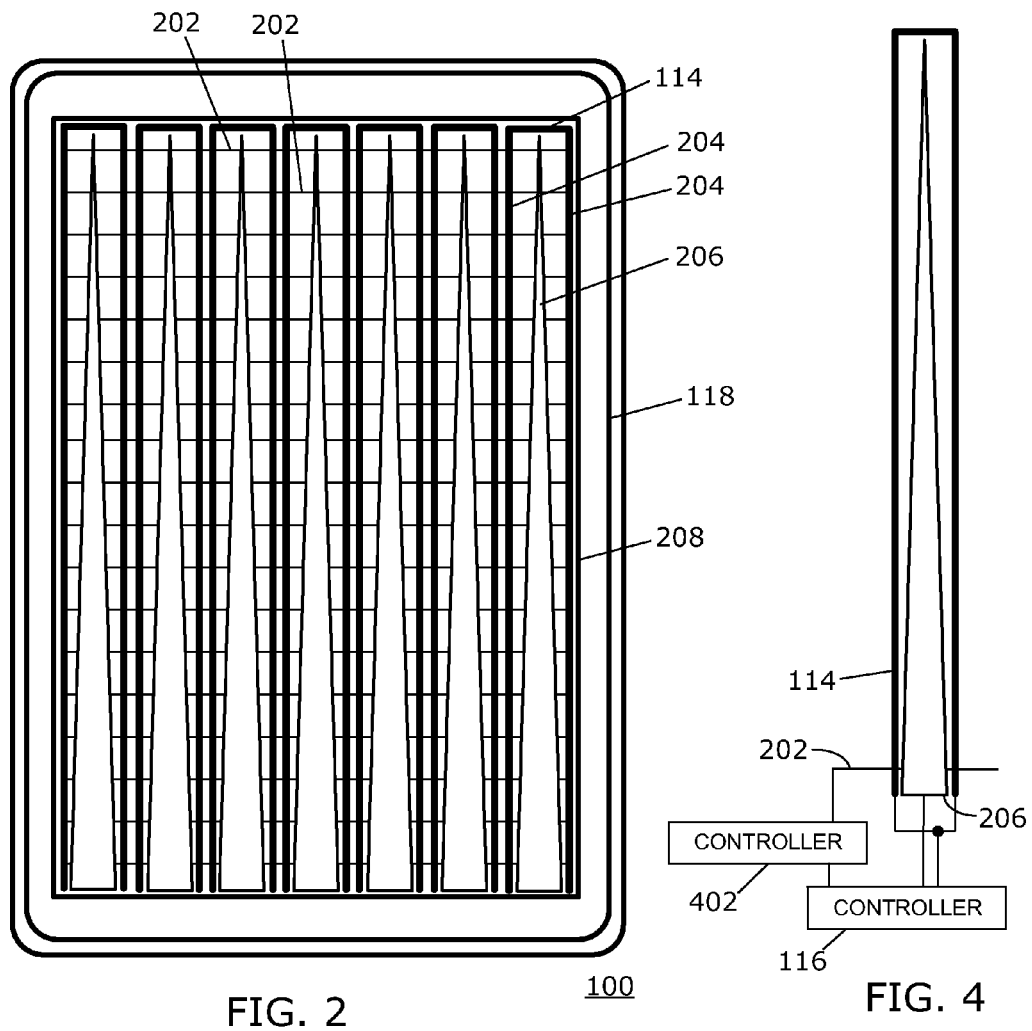
FIG. 2
FIG. 4
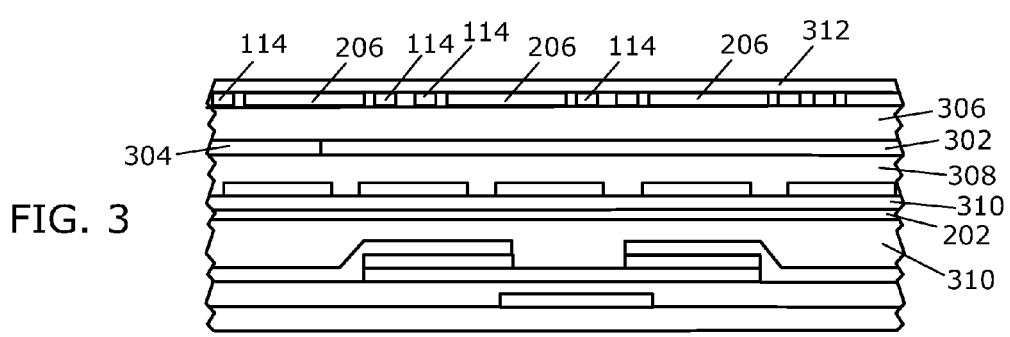
FIG. 3

ELECTRONIC DEVICE INCLUDING TOUCH-SENSITIVE DISPLAY AND METHOD OF DETECTING TOUCHES

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and may have limited space for user input and output. The information displayed on the display may be modified depending on the functions and operations being performed.

Improvements in electronic devices with touch-sensitive displays are desirable.

BRIEF DESCRIPTION OF THE DRAWINGS

FIG. 2 is a front view of one example of an electronic device in accordance with the disclosure.

FIG. 3 is a partial cross section of one example of a touch-sensitive display in accordance with the disclosure.

FIG. 4 is a diagram illustrating a drive electrode, a sense electrode, and an additional electrode in accordance with the disclosure.

DETAILED DESCRIPTION

Figure 1:
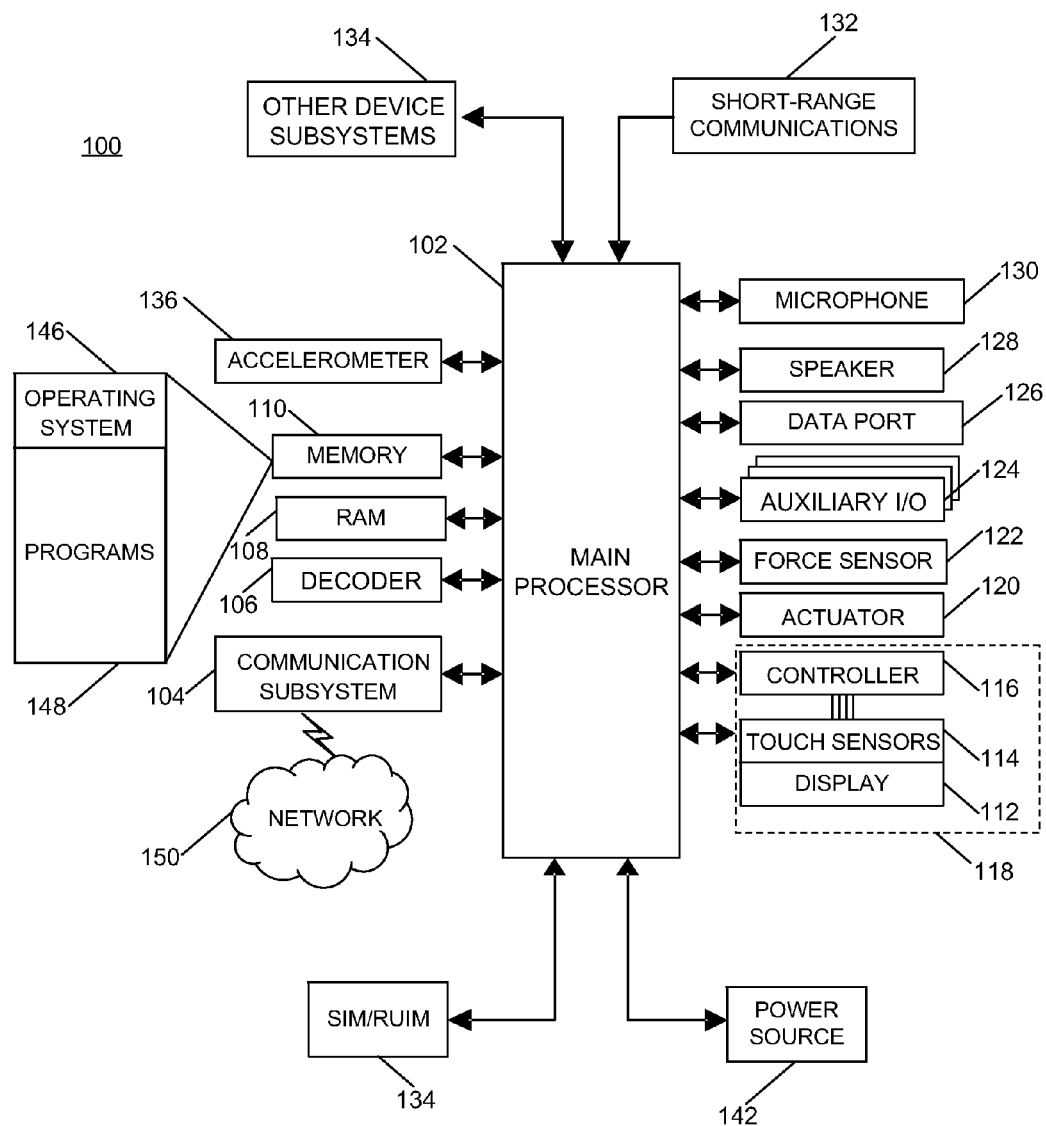
FIG. 1 is a block diagram of a portable electronic device in accordance with the disclosure.

The following describes an electronic device and a method that includes detecting touches by mutual-capacitance touch sensing utilizing first electrodes and second electrodes of a touch-sensitive display, and detecting touches by self-capacitance touch sensing utilizing the second electrodes and third electrodes of the touch-sensitive display, wherein the first electrodes are different from the third electrodes.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to a touch controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

A front view of an example of the electronic device 100 is shown in FIG. 2. The electronic device 100 includes the touch-sensitive display 118. The touch-sensitive display 118 may be a capacitive touch-sensitive display that includes capacitive touch sensors. The touch sensors include, for example, drive electrodes 202, also referred to as scanning electrodes. The drive electrodes 202 in this example are the common electrodes utilized for the display 112 and are coupled to a display controller that is part of the display 112. Thus, the drive electrodes 202 also function as common electrodes to display information on the display 112. The touch sensors also include the sense electrodes 114. Each sense electrode 114 is generally U-shaped, including two parallel fingers 204. The ends of the parallel fingers 204 are coupled to the touch controller 116.

The touch-sensitive display 118 also includes additional electrodes 206. In this example, the additional electrodes 206 are disposed between the sense electrodes 114 such that each additional electrode 206 is disposed between the fingers of a respective one of the sense electrodes 114. The additional electrodes 206 are shaped such that the additional electrodes 206 are wider at the end at which the additional electrodes are coupled to the touch controller 116 than at the opposing end, to facilitate detection of touch location along the length of the additional electrodes 206. The additional electrodes 206 are solid electrodes in this example and are shown in outline for the purpose of illustration. Other suitable electrode shapes may be utilized.

The touch-sensitive display 118 includes a display area in which information may be displayed, and a non-display area extending around the periphery of the display area. The display area may include the area inside the rectangle 208 in FIG. 2 and the non-display area may include a surrounding area. Information is typically not displayed in the non-display area, which area is utilized to accommodate, for example, electronic traces or electrical connections, adhesives or other sealants, and/or protective coatings around the edges of the display area. The electrodes 202, the electrodes 204, and the electrodes 206 may be disposed in the non-display area or may extend from the display area into the non-display area.

The drive electrodes 202, the sense electrodes 114, and the additional electrodes 206 may comprise any suitable material, such as indium tin oxide (ITO). The drive electrodes 202, the sense electrodes 114, and the additional electrodes 206 are not visible to the naked eye when viewing the electronic device 100 in a normal operating manner, but are shown in the FIG. 2 through FIG. 4 for the purpose of illustration.

A partial cross section of the touch-sensitive display 118 is shown in FIG. 3. The display 112 may include, for example, a thin-film transistor (TFT) structure and a color filter 302 and black matrix 304 disposed on a substrate 306. The common electrodes of the display 112 are utilized as the drive electrodes 202 of the touch-sensitive display 118. In this example, the drive electrodes 202 are disposed between dielectric layers 310 of the TFT structure and are disposed under the liquid crystal 308.

The sense electrodes 114 and the additional electrodes 206 are disposed on the substrate 306, for example, by patterning a shield of ITO disposed on the substrate 306. Thus, the color filter 302 and black matrix 304 are disposed on one side of the substrate 306, and the sense electrodes 114 and additional electrodes are disposed on the opposite side of the substrate 306. An outer polarizer 312 is disposed on the sense electrodes 114 and additional electrodes. The sense electrodes 114 and the additional electrodes 206 are disposed on the same layer in the touch-sensitive display 118.

A diagram illustrating a drive electrode 202, a sense electrode 114, and an additional electrode 206 is shown in FIG. 4. The drive electrode 202 is coupled to a display controller 402. The sense electrode 114 and the additional electrode 206 are coupled to the touch controller 116. The drive electrode 202 may be coupled to the display controller 402 by, for example, a flex connector. The sense electrode 114 and the additional electrode 206 may be coupled to the touch controller 116 by a flex connector such that the sense electrode 114 and the additional electrode 206 are not directly electrically connected. The sense electrode 114 and the additional electrode 206 may be coupled to the touch controller 116 by the flex connector utilized to couple the drive electrode 202 to the display controller 402 or by another flex connector. The display controller 402 and the touch controller 116 may be coupled together to communicate and coordinate driving of the drive electrodes 202 while sensing with the sense electrodes 114.

The drive electrodes 202 and the sense electrodes 114 may be utilized to detect a touch by mutual-capacitance touch sensing. To detect a touch, drive electrodes 202 are driven by the display controller 402 such that pulses of signal are carried by the drive electrodes 202. The signal may be current or applied voltage. The sense electrodes 114 are utilized to detect changes in the signal at the nodes, which are the locations at which the fingers 204 of the sense electrodes 114 cross over the drive electrodes 202. To determine a touch location, the touch-sensitive display 118 is scanned by driving the drive electrodes 202 while signals from sense electrodes 114 are received at the touch controller 116. Each scan of the touch-sensitive display 118 includes multiple frames. In each frame, a drive electrode 202 is driven utilizing multiple pulses, while receiving signals from a sense electrode 114. Each drive electrode 204 may be driven in multiple frames while sensing utilizing each of the sense electrodes 204. The additional electrodes 206 are not utilized during mutual-capacitance touch sensing.

To operate at reduced power, for example, when the electronic device 100 is locked, or when a touch is not detected in a threshold period of time, the display 112, including the display controller 402, may be turned off or may operate in a reduced power condition. To detect a touch when the display 112 is off, and the display controller 402 is not driving the drive electrodes 202, the sense electrodes 114 and the additional electrodes 206 are utilized. The touch is detected by self capacitance touch sensing. A touch on the touch-sensitive display 118 alters the electrical charge on the sense electrodes 114 and additional electrodes 206 near the touch. The change in electrical charge on the sense electrodes 114 and on the additional electrodes 206 is detected at the touch controller 116.

The area of contact or area of the touch and proximity of the touch location to the electrode affect the change in the electrical charge. A gesture may be detected on the touch-sensitive display 118. For example, a change in location of a touch that follows a path generally along a drive electrode 202 may be detected by the sense electrodes 114. A change in location of a touch that follows a path generally along a sense electrode 114 is not detected by the sense electrode 114 when detecting touches by self-capacitance touch sensing. The change in location is detected by the nearest additional electrodes 206 because the width of the electrode 206 is greater at one end than the other. Thus, the change in electrical charge along the electrode 206 is greater when the touch is near the wide end of the electrode 206 than when the touch is near the opposite end of the electrode 206. This change in electrical charge is detected by the touch controller 116, and a gesture in any direction on the touch-sensitive display 118 may be detected.

Figure 5:
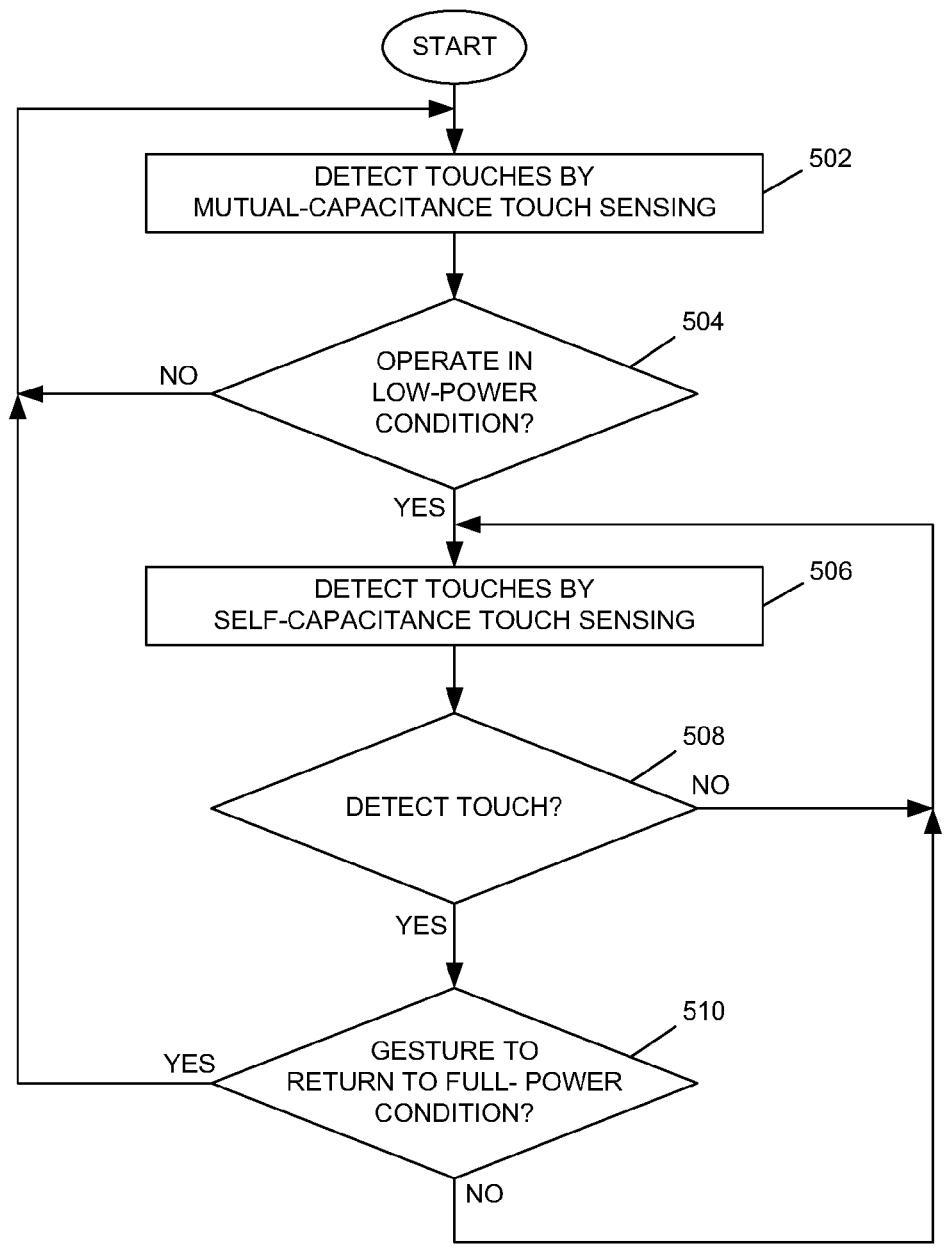
FIG. 5 is a flowchart illustrating an example of a method of detecting touches on a touch-sensitive display in accordance with the disclosure.

A flowchart illustrating an example of a method of detecting touches on the touch-sensitive display 118 is shown in FIG. 5. The method may be carried out by software executed, for example, by the processor 102 and the touch controller 116. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, such as a non-transitory computer-readable storage medium, which medium is tangible.

During operation of the portable electronic device 100, touches are detected 502 by mutual-capacitance touch sensing by driving the drive electrodes 202 while signals from the sense electrodes 114 are received at the touch controller 116.

When the device 100 enters a low-power condition 504, the process continues at 506, and touches are detected 506 by self-capacitance touch sensing. The low-power condition or reduced power condition, which may be referred to as a "sleep" condition or state, is a condition in which no information is typically displayed on the touch-sensitive display. During a low-power condition, processes with the electronic device 100 may be discontinued or operated at a slower speed and one or more hardware components may be powered-down or operated at a slower speed to conserve power or provide other advantages. The electronic device 100 may operate in the low-power condition when the processor 102 determines that no touch is detected on the touch-sensitive display 118 for a period of time that meets a threshold, when no input is generally detected by the electronic device 100, when the device is locked by selection of a button or receipt of a gesture on the touch-sensitive display 118, or when the device is placed in a holster or covered by a cover, to name a few examples. An indication or command to operate in the low-power condition may be sent from the processor 102 and received at the touch controller 116 and the display controller 402. During self-capacitance touch sensing, the display 112, including the display controller 402, may be turned off or may "sleep". The drive electrodes 202 are not utilized for touch sensing and the controller 402 is not utilized to drive the drive electrodes 202.

When a touch is detected 508, the touch data is compared to stored touch data to determine when the touch is a gesture to operate in a full-power condition. When the touch is a gesture to return to the full-power condition, the touch controller 102 may send an indication or a command to the processor 102 and/or the display controller 402, and touches are again detected 502 by mutual-capacitance touch sensing. The touch may be a gesture to return to the full-power condition, for example, to unlock the electronic device 100, to engage full operation of the electronic device 100, or to wake up the electronic device 100.

A touch-sensitive display includes first electrodes and second electrodes arranged and constructed to detect touches by mutual-capacitance touch sensing, and third electrodes and the second electrodes arranged and constructed to detect touches by self-capacitance touch sensing, wherein the first electrodes are different from the third electrodes.

A method includes detecting touches by mutual-capacitance touch sensing utilizing first electrodes and second electrodes of a touch-sensitive display and detecting touches by self-capacitance touch sensing utilizing the second electrodes and third electrodes of the touch-sensitive display, wherein the first electrodes are different from the third electrodes.

Utilizing the additional electrodes 206 during self-capacitance touch sensing, a gesture, such as a sliding gesture along one of the sense electrodes 114, may be detected. The additional electrodes 206 facilitate determination of gesture direction during self-capacitance touch sensing. Thus, gesture direction may be determined without utilizing drive electrodes. In an electronic device 100 that includes a touch sensors in the display, such as the in-cell touch-sensitive display 118, touches may be detected and gesture direction determined when the display controller is off. Thus, gesture direction may be detected when the electronic device 100 is in a low-power or reduced power condition, and the display, including the display controller, is not utilized. Power utilized by the display controller, also referred to as the display driver, may be very high compared to the touch controller. Thus, turning off the display controller reduces power consumption.

A touch-sensitive display includes first electrodes and second electrodes arranged and constructed to detect touches by mutual-capacitance touch sensing, and third electrodes and the second electrodes arranged and constructed to detect touches by self-capacitance touch sensing, wherein the first electrodes are different from the third electrodes. A method includes detecting touches by mutual-capacitance touch sensing utilizing first electrodes and second electrodes of a touch-sensitive display, and detecting touches by self-capacitance touch sensing utilizing the second electrodes and third electrodes of the touch-sensitive display, wherein the first electrodes are different from the third electrodes.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A touch-sensitive display comprising:
common electrodes of a display and second electrodes coupled to at least one controller to detect touches by mutual-capacitance touch sensing, wherein the second electrodes each include fingers joined at ends thereof to provide a generally U-shaped electrode on the touch-sensitive display; and
third electrodes disposed between the fingers of the second electrodes such that one of the third electrodes is disposed between the fingers of one of the second electrodes, the third electrodes and the second electrodes coupled to the at least one controller to detect touches by self-capacitance touch sensing when the touch-sensitive display is operating in a low power condition,
wherein the third electrodes are wider at a first end than a second end such that the third electrodes are shaped to, by the at least one controller, identify a location of a touch at least one of the third electrodes, to identify the location along a length of the one of the third electrodes when the touch-sensitive display is operation in the low power condition, and to detect a gesture and identify a direction of the gesture along a length of at least one of the fingers of the second electrodes during detection of touches by the self-capacitance touch sensing when the touch-sensitive display is operating in the low power condition,
wherein the common electrodes are not utilized during the self-capacitance touch sensing, when the touch-sensitive display is operating in the low power condition,
wherein the at least one controller comprises a touch controller coupled to the second electrodes to sense a touch when the second electrodes are utilized to detect touches by the mutual-capacitance touch sensing, and a display controller is coupled to the common electrodes to drive the common electrodes when the common electrodes are utilized to detect touches,
wherein the touch controller is coupled to the third electrodes to sense touches when the third electrodes are utilized to detect touches by the self-capacitance touch sensing, and
wherein the third electrodes are not utilized during the mutual-capacitance touch sensing.

2. A portable electronic device comprising: a touch-sensitive display comprising:
common electrodes of a display and second electrodes coupled to at least one controller to detect touches by mutual-capacitance touch sensing, wherein the second electrodes each include fingers joined at ends thereof to provide a generally U-shaped electrode on the touch-sensitive display; and
third electrodes disposed between the fingers of the second electrodes such that one of the third electrodes is disposed between the fingers of one of the second electrodes, the third electrodes and the second electrodes coupled to the at least one controller to detect touches by self-capacitance touch sensing when the touch-sensitive display is operating in a low power condition,
wherein the third electrodes are wider at a first end than a second end such that the third electrodes are shaped to, by the at least one controller, identify a location of a touch at least one of the third electrodes, to identify the location along a length of the one of the third electrodes when the touch-sensitive display is operating in the low power condition, and to detect a gesture and identify a direction of the gesture along a length of at least one of the fingers of the second electrodes during detection of touches by the self-capacitance touch sensing when the touch-sensitive display is operating in the low power condition,
wherein the common electrodes are not utilized during the self-capacitance touch sensing, when the touch-sensitive display is operating in the low power condition,
wherein the at least one controller comprises a touch controller coupled to the second electrodes to sense a touch when the second electrodes are utilized to detect touches by the mutual-capacitance touch sensing, and a display controller is coupled to the common electrodes to drive the common electrodes when the common electrodes are utilized to detect touches,
wherein the touch controller is coupled to the third electrodes to sense touches when the third electrodes are utilized to detect touches by the self-capacitance touch sensing, and
wherein the third electrodes are not utilized during the mutual-capacitance touch sensing.

3. A method comprising:
detecting touches by mutual-capacitance touch sensing utilizing common electrodes utilized to display information and second electrodes of a touch-sensitive display, which second electrodes each include two fingers joined at ends thereof to provide a generally U-shaped electrode on the touch-sensitive display; and
detecting touches by self-capacitance touch sensing utilizing the second electrodes and third electrodes of the touch-sensitive display when the touch-sensitive display is operating in a low power condition, which the third electrodes are disposed between the fingers of the second electrodes such that one of the third electrodes is disposed between the fingers of one of the second electrodes, wherein the third electrodes are wider at a first end than a second end such that the third electrodes are shaped to, by at least one controller coupled to the third electrodes, identify a location of a touch on at least one of the third electrodes, to identify the location along a length of one of the third electrodes when the touch-sensitive display is operating in the low power condition, and to detect a gesture and identify a direction of the gesture along a length of at least one of the fingers of the second electrodes during detection of touches by the self-capacitance touch sensing when the touch-sensitive display is operating in the low power condition, wherein the common electrodes are not utilized during the self-capacitance touch sensing, when the touch-sensitive display is operating in the low power condition, wherein the at least one controller comprises a touch controller coupled to the second electrodes to sense a touch when the second electrodes are utilized to detect touches by the mutual-capacitance touch sensing, and a display controller is coupled to the common electrodes to drive the common electrodes when the common electrodes are utilized to detect touches, wherein the touch controller is coupled to the third electrodes to sense touches when the third electrodes are utilized to detect touches by the self-capacitance touch sensing, and wherein the third electrodes are not utilized during the mutual-capacitance touch sensing.

\* \* \* \* \*

UNITED STATES PATENT AND TRADEMARK OFFICE
CERTIFICATE OF CORRECTION

| | | |
|---|---|---|
| PATENT NO. | : 9,244,572 B2 | Page 1 of 1 |
| APPLICATION NO. | : 13/464811 | |
| DATED | : January 26, 2016 | |
| INVENTOR(S) | : Amit Pal Singh and John Edward Dolson | |

It is certified that error appears in the above-identified patent and that said Letters Patent is hereby corrected as shown below:

Claims

Column 7, line 54, claim 1, delete "operation" and insert therefore -- operating --

Signed and Sealed this
Tenth Day of May, 2016

Michelle K. Lee
*Director of the United States Patent and Trademark Office*